United States Patent [19]

Kirk

[11] Patent Number: 4,744,665
[45] Date of Patent: May 17, 1988

[54] AUTOMATED OPTICAL LINEWIDTH MEASUREMENT

[75] Inventor: Christopher P. Kirk, Haxby, United Kingdom

[73] Assignee: Vickers PLC, London, England

[21] Appl. No.: 840,605

[22] Filed: Mar. 17, 1986

[30] Foreign Application Priority Data

Mar. 26, 1985 [GB] United Kingdom ............... 8507843

[51] Int. Cl.⁴ .............................................. G01B 11/02
[52] U.S. Cl. ..................... 356/384; 356/390
[58] Field of Search ................... 356/390, 384–385, 356/372

[56] References Cited

U.S. PATENT DOCUMENTS 4,287,532  9/1981  Moore ............................... 356/384
4,443,816  4/1984  Hogan, Jr. et al. ................ 356/384

FOREIGN PATENT DOCUMENTS 1375036  11/1974  United Kingdom .
2027203  2/1980   United Kingdom .
2149098  6/1985   United Kingdom .

OTHER PUBLICATIONS

"The Theoretical Basis of a New Optical Method for the Accurate Measurement of Small Line Widths", Swing, *SPIE vol. 80 Developments in Semiconductor Microlithgraphy*, 1976.

Primary Examiner—R. A. Rosenberger
Assistant Examiner—Crystal D. Cooper
Attorney, Agent, or Firm—Wood, Dalton, Phillips, Mason & Rowe

[57] ABSTRACT

Optical metrology method and apparatus in which the sheared portions of an optical image are automatically aligned so as to enable the widths of high contrast lines to be measured using optical image shearing. A mechanism splits a line image of an object into two, shears the two images and records the displacement distance, and an imaging system e.g. a television camera generates an electronic signal which represents the intensity profile of the sheared image in a direction perpendicular to the line image and parallel to the direction of shear. The intensity profile of the sheared image is sampled and digitized, and the digital signal is correlated with a digital filter. A mechanism then adjusts the shearing to a position given by an electronic signal, and the two positions taken up by the shearing mechanism are recorded, the difference therebetween is calculated, and then multiplied by a calibration constant, to provide line width information to be displayed on a display device.

7 Claims, 4 Drawing Sheets

AUTOMATED OPTICAL LINEWIDTH MEASUREMENT

FIELD OF THE INVENTION

This invention relates generally to optical metrology, and is concerned with apparatus and method for automatically aligning the sheared portions of an optical image. The invention is particularly, though not exclusively, suitable for use in measuring the widths of high contrast lines using optical image shearing.

BACKGROUND OF THE INVENTION

In the semiconductor industry it is necessary to measure the widths of lines on photomasks and also in the manufacture of magnetic recording heads it is required to measure the width of the gap in the magnetic circuit. Both these objects form high contrast images which exhibit very little ringing at the edges when viewed using partially coherent illumination. This means that the technique of image shearing may be used to obtain a measure of the width of the line.

In order to measure a linewidth using image shearing, the image is split into two and the two images are displaced relative to each other in a direction perpendicular to the line image until the two images just touch at opposing edges. When this condition is reached the two lines appear to merge into one broad line.

If the image is a dark line on a bright background then this will produce a broad dark line on a bright background with an intensity equal to the mean of the bright and dark areas. If the displacement of the two images is too small then a dark line will appear where the two images meet. Similarly, if the displacement between the two images is too great, then a bright line will appear where the two line images meet.

In conventional manual measurement systems a shearing mechanism is adjusted manually until the two line images merge into one with neither a bright nor dark line between them. The position of the shearing mechanism is recorded and used as a zero reference. The images are then displaced by an equal and opposite amount and the shearing mechanism is adjusted until the two images merge into one. The difference between the new position of the shearing mechanism and the previous reference zero position is proportional to a measure of twice the width of the line. Thus a linewidth measurement may be computed.

The present invention has been developed using a novel technique for detecting the degree of misalignment of two opposing edges in a sheared image and using this to automate the measurement of a linewidth in an optical image. A signal is generated to indicate the degree of misalignment and this may be fed back to the shearing mechanism and used to set the shearing to the correct edge setting.

SUMMARY OF THE INVENTION

According to one aspect of the invention there is provided apparatus for automatically measuring the width of a line in an optical image and comprising;

a mechanism for splitting an image into two, shearing the two images and recording the displacement distance;

an imaging system for generating an electronic signal which represents the intensity profile of the sheared image in a direction perpendicular to the line image and parallel to the direction of shear;

a mechanism for sampling and digitising the intensity profile of the sheared image;

a means for correlating the digital signal with a digital filter;

a mechanism for adjusting the shearing to a position given by an electronic signal; and a means for recording two positions of the shearing mechanism, calculating the difference between them and multiplying this by a calibration constant.

According to a further aspect of the invention there is provided a method of automatically measuring the width of a line in an optical image and comprising the steps of:

splitting an optical image into two, displacing one image relative to the other and measuring the displacement distance;

generating an electronic signal which represents the intensity profile of the sheared image;

converting the electronic signal into a sampled and digitised signal;

locating a section of this array and correlating it with a digital filter;

detecting the peak filter response from this array;

adjusting the shearing in order to minimize the peak response;

recording the two edge to edge shear conditions which give this minimum; and computing and displaying or communicating the width of the line image.

The invention also provides apparatus for automatically measuring the width of a line in an optical image and comprising:

an optical microscope having a mounting stage for mounting an object to be measured, and an objective automatically focussable on the object;

an automated image shearing module mounted on the microscope and operable to split a line image of the object into two, and to shear the two images;

an imaging system for generating an electronic signal which represents the intensity profile of the sheared image in a direction perpendicular to the line image and parallel to the direction of shear;

a computer terminal coupled with the microscope and having a computer, a keyboard which is operable to program the computer with instruction and control data corresponding to each object to be measured, a first display device for displaying intensity profile of the sheared image generated by the imaging system, and a second display device for displaying operating instructions; and an operating keypad coupled with the microscope for operation of the apparatus under instruction from the second display device.

DESCRIPTION OF PREFERRED EMBODIMENTS

Reference will now be made to FIGS. 1a to 1d of the drawings, which concerns the intensity profile of the sheared image.

Figure 1:
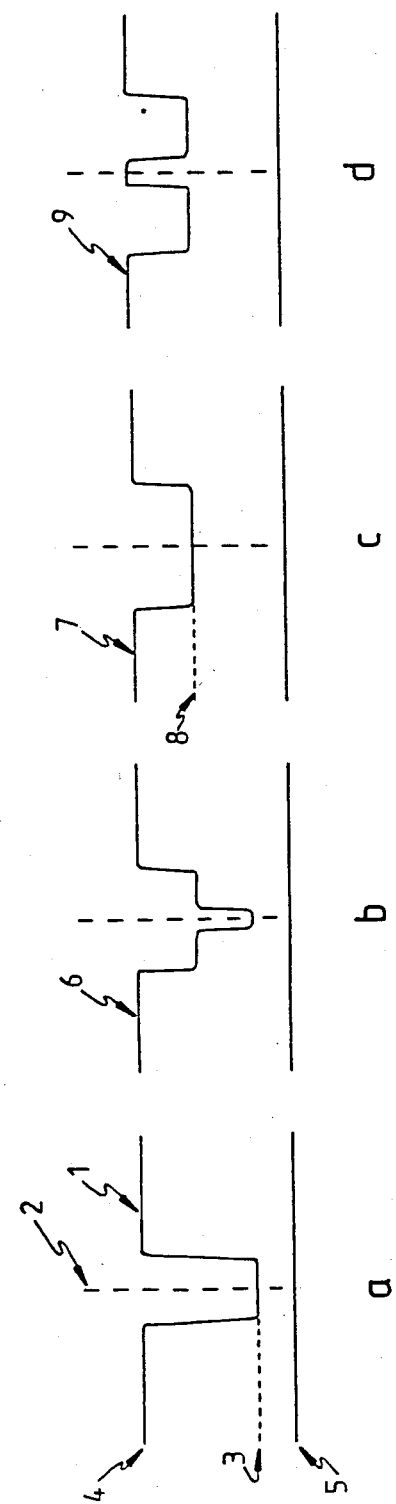
FIG. 1 is a schematic illustration of the intensity profiles of the sheared image of a dark line on a bright background, in a direction perpendicular to the line and parallel to the direction of shear.

There is shown in FIG. 1a an image intensity profile 1 of a dark line on a background with its centre marked by a dashed line 2. The image has a minimum intensity $I_o$ designated by reference 3 and a maximum intensity $I_m$ designated by reference 4. The zero intensity level is shown by the base line 5.

In FIG. 1b the image has been split into two, but the two images have not been displaced far enough apart to be touching exactly at the edges. FIG. 1c shows the condition for which the images are regarded as touching at the edges and this is taken as the edge setting. The intensity at the edge 8 is given by, $$I_e = 0.5(I_m + I_o) \qquad (1)$$

In FIG. 1d the images have been displaced by an amount greater than their width and this produces a bright strip along the centre line.

Using the conventional image shearing technique the edge setting would be performed by an operator observing either the sheared optical image or a graphical representation of the intensity profile of the sheared image. The main feature of this invention is to provide a means to perform this edge setting automatically without involving the operator's judgement.

Figure 2:
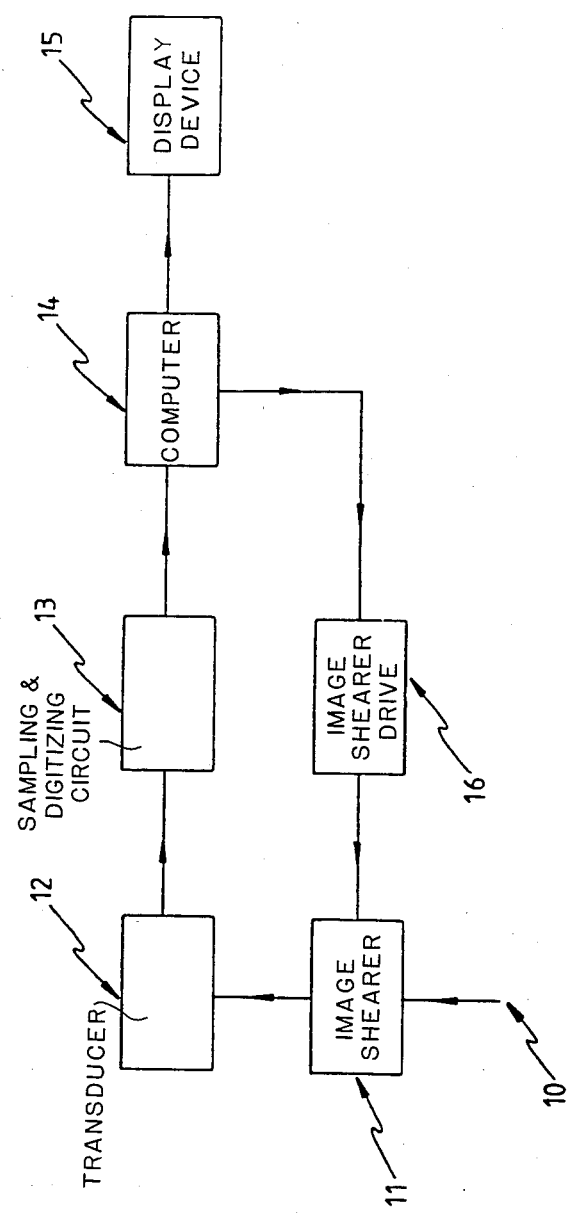
FIG. 2 is a schematic illustration of apparatus according to the invention.

Referring now to FIG. 2 of the drawings, there is shown an embodiment of the automatic edge setting apparatus according to the invention which is capable of carrying out automated edge to edge settings and automated linewidth measurements according to the invention. The apparatus consists of a means 10 of providing an optical image, shearing means 11 for shearing this optical image, a transducer 12 which is capable of providing an electrical signal which represents the intensity distribution across the sheared optical image, a circuit 13 for sampling and digitising this signal, a computing device 14, a means 15 of displaying or communicating results and a drive mechanism 16 for adjusting the shear to a position determined by a signal from the computing device 14.

The transducer 12 may take the form of any device which is capable of providing a signal which indicates the image intensity profile across the sheared image. Typically, though not exclusively it may take the form of a television camera, an array of charge coupled photosensitive devices or a scanning slit and photomultiplier. The transducer and shearing mechanism are arranged in order to form an image on the photosensitive area in such a way as to enable an intensity profile of the sheared image to be obtained in a direction parallel to the direction of shear and perpendicular to the direction of the line in the image. If the chosen transducer is a raster scan device, such as a television camera, then an intensity profile signal may be obtained with the line image parallel or perpendicular to the raster scan. If the line and the raster are parallel then the profile may be obtained by sampling each successive scan line in the same place. Alternatively, if the line is perpendicular to the raster then an image intensity profile may be obtained directly from one or more raster scan lines.

The sampling and digitising circuit 13 converts the image intensity profile into an array of digital values representing the profile. These values are loaded into the computing device 14 which gates and filters the data in order to detect the degree of edge to edge setting error. The computing device 14 controls the drive mechanism 16 which adjusts the shearing position to a digital value generated by the computing device 14. The display device 15 preferably takes the form of a computer terminal, another computing device or a set of indicators, though this is not essential and other types of display device may be used. This is used to communicate the measured width of the feature and any error signals if required.

The operation of the apparatus will now be described in more detail. The computing device sets the shearing mechanism to zero shear in order to produce an unsheared image of the line to be measured. The sampled and digitised image intensity profile is then read into the computing device. From this profile the computing device calculates an approximate linewidth taking as the line edges, the points where the intensity has the mean value of the maximum and minimum values of the profile ($I_e$). The next part of the operation involves performing an edge to edge setting on the sheared line image and there are two methods for doing this.

The first method involves the computing device sending a signal to the shear drive mechanism 16 which causes it to move by an amount equal to approximately one linewidth, but with a small known offset. The offset may cause the shearing to be too small or two large and for this example it will be assumed that the offset has been deliberately chosen to cause the shearing adjustment to be too small. When this position has been reached the computing device executes the following loop.

The computing device reads the image intensity profile and correlates it with a digital filter. The peak value of this correlation is stored together with the current shearing position. The computing device then causes the shearing mechanism to increase the shear by a known small increment.

This is repeated until the shearing has stepped right through the edge setting position estimated from the approximate linewidth. The computing device then examines the values it has calculated using the peak response from the digital filter and locates the position where the peak response to the sheared image intensity profile was at a minimum. The computing device then returns the shearing to this position and defines this as the edge setting and the reference zero.

The second method for achieving an edge setting involves performing an iteration. Once the computing device has calculated the approximate linewidth, the shearing is adjusted by the computing device by this amount. The system now enters an iterative loop.

The computing device reads the image intensity profile and correlates it with a digital filter. The digital filter has been designed to produce a signal of one polarity for over shear errors and a signal of the opposite polarity for undershear errors. The filter has also been designed to produce an output which increases in magnitude away from the edge to edge setting position. From a predetermined curve, the computing device determines the magnitude and sign of the shearing error and unless this is sufficiently close to zero it sends an increment to the shearing drive in order to correct this error. If the filter output is sufficiently close to zero then the iteration stops; if not the loop is repeated.

When the iteration is complete the shearing mechanism has come to rest at the edge to edge setting and this is recorded as the reference zero.

Both methods of edge to edge setting have now arrived at the same point. This reference zero position may be stored in the computing device or communicated to another device. The computing device then sends a signal to the shear drive to cause the shearing to move to the equal and opposite position and then either of the two algorithms described above are employed in order to perform another edge to edge setting. From this new edge to edge setting and the previously stored reference zero the linewidth may be computed.

The operation and implementation of the digital filters will now be described in more detail.

At the start of the measurement the computing device calculates the approximate linewidth from the unsheared image intensity profile. The linewidth is computed by locating two edge thresholds and so it is also possible to calculate the position of the line centre. Also from the linewidth value and the shear position it is possible to calculate how far on either side of the centre of the sheared line image, the profile may be filtered before the outer edges are encountered. In this way the computing device calculates the section of the intensity profile array which may be safely examined.

It is this section of the profile which is then correlated with a digital filter according to equation 2.

$$D(n) = \sum_{i=1}^{r} F(i) \cdot I(i + n - 0.5r) \quad (2)$$

Where F( ) is the digital filter and I( ) is the sampled digitised image intensity profile. The upper and lower bounds of n represent the previous calculated limits of the array which indicate the section which is safe to examine. The peak value of D( ) is used to indicate the error in the edge to edge setting.

The choice of digital filter will depend on the type of feature being measured, the resolution of the system and the sampling rate. The following example describes one particular filter for an application where the sampling rate is higher than the resolution of the system and the images have reasonably high contrast.

Figure 3:
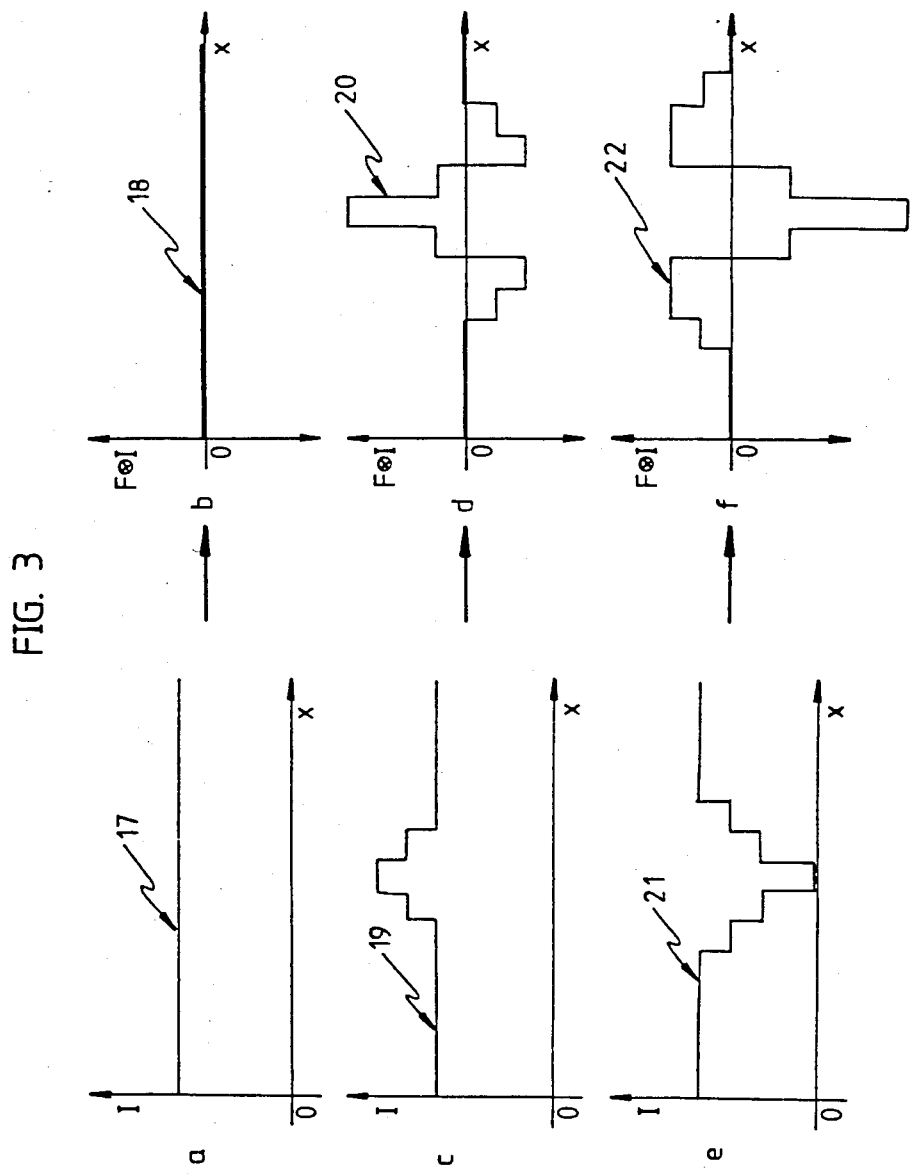
FIG. 3 is a schematic illustration of the waveforms which lead to the detection of shearing misalignment.

FIG. 3 of the drawings shows three sampled intensity profiles of sheared line images which have been restricted to the section which contains the edges which are being aligned. The other profiles have been filtered with the array [−1,0,2,0,−1] but many others arrays could also be used.

FIG. 3a shows the intensity profile of a sheared line object 17 where the edges are in correct alignment with no shearing error. FIG. 3b shows the same array but after it has been filtered (18) and this has reduced the signal to zero. FIG. 3c shows the digitised and sampled intensity profile 19 of an over sheared dark line restricted to the area around the overlapping edges. FIG. 3d shows the same profile but after filtering (20). The background level of the signal has again been reduced to zero by the filter, but the peak due to the overlap has been enhanced. FIG. 3e shows the intensity profile 21 of an undersheared line image and the shearing error is greater than in FIG. 3c. FIG. 3f shows the same array but after filtering (22). Again the filter has reduced the background level to zero and has enhanced the dip in the profile. The magnitude of the response in FIG. 3f is greater than in FIG. 3d as the original shearing error was greater. Also the polarity of the signal has changed as the polarity of the shear error has also changed. Thus the filter output with the greatest magnitude can be used to give a sign and magnitude indication of the shearing error.

Figure 4:
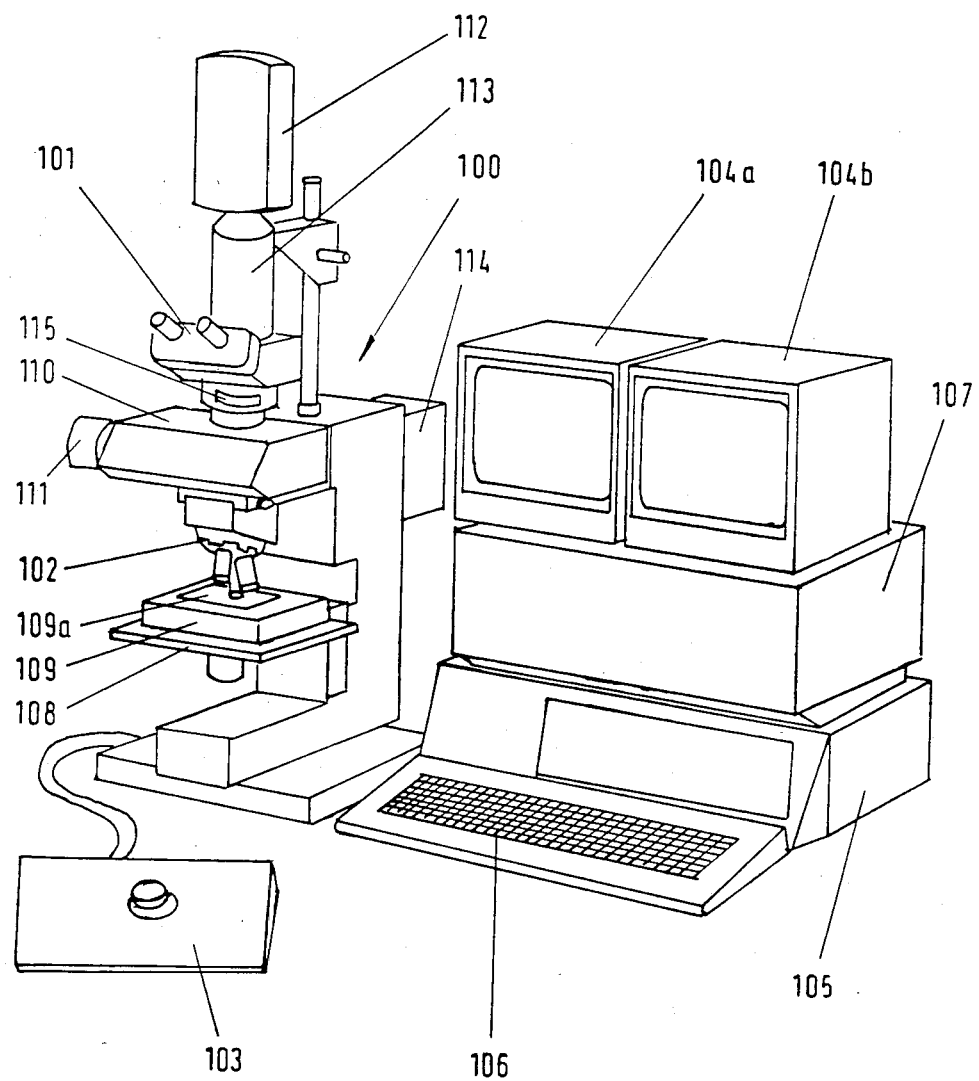
FIG. 4 is a perspective view of a combined optical microscope and coupled television apparatus forming one practical example of apparatus according to the invention.

Referring now to FIG. 4 of the drawings, there is shown in detail a practical embodiment of coupled microscope and television apparatus according to the invention, which can be used for the automated measurement of magnetic head dimensions. However, while the particular apparatus shown in FIG. 4 is designed primarily for measurement of magnetic head dimensions, the apparatus may readily be employed, with minor modification, in order to carry out linewidth measurements, in which the "line" is very narrow e.g. a line on a photomask used in the semiconductor industry, or a line on a wafer.

The apparatus shown in FIG. 4 comprises an optical microscope 100 having a trinocular viewing system 101, a motorised objective 102, and an operator keypad 103. A coupled television and computer module comprises a pair of TV screens 104a and 104b, a computer 105, a computer keyboard 106 and an electronic control box 107.

Returning now to the microscope 100, this has an X,Y,Z stage 108, on which is mounted a holder 109 having a recess in which a plastics grid tray 109a is mounted. The tray 109a has a number of spaced-apart recesses (not shown) in which an array of magnetic heads can be located, the dimensions of which are to be measured automatically by the apparatus.

Above the objective 102, there is mounted an automated image shearing module 110, having a motor 111. A TV camera 112 is arranged above the trinocular viewing system 101, with an image equalisation device 113 located therebetween. An illumination source 114 is mounted on the back of the microscope stand, and a magnification changer 115 is mounted below the viewing system 101.

In use of the apparatus, a programmer will provide suitable input to the computer 105 via the keyboard 106, to provide stored programs suitable to the different types of measurement tasks which the apparatus is intended to carry out. An operator can then operate the keypad 103, after operation of a suitable key code, corresponding to the particular object to be measured on the holder 109. The TV screen 104a provides a CC TV picture, and also illustrates the intensity profiles of the lines being measured, as well as the position of the cursor. The screen 104b illustrates text setting out a sequence of operating steps for the operator.

The entire apparatus is automated, and is particularly suitable for the automatic measurement of, in particular, magnetic measuring heads which are supplied in arrays in the plastics tray 109a.

The system is simple and easy to operate, and screen based commands direct the operator quickly and safely through the measurement routines, and the keypad 103, which is a dedicated keypad, conveniently groups the operator function keys. Measurement and focus are simple push-button operations, totally automated and independent of operator subjectivity. A flexure drive (not shown) on the stage 108 moves quickly and repeatably to achieve perfect focus. Illumination is controlled, and a special look-up calibration fitting routine in the computer software gives accurate readings.

The entire sequence of focus, illumination and measurement of gap length is achieved rapidly. The objective changer 102 is motorised, and the system quickly steps through magnification changes, automatically compensating for different focal distances, which further speeds up the operation.

Gap lengths as small as 0.2 micron (8 microinches) can be measured to a precision of 0.007 micron (0.3 microinches) at single sigma confidence limits. In addition, there is motorised image rotation, to achieve measurement of track width, as well as gap length. 90° image rotation and step down magnification allows full measurement of all magnetic head geometries, both large and small.

Further, as indicated above, the apparatus can readily be modified in order to carry out precision measurements of other very small dimensions e.g. lines on semiconductor wafers.

I claim:

1. Apparatus for automatically measuring the width of a line in an optical image, said apparatus comprising:
    shearing means for splitting an optical image into two superimposed images, and shearing the two images;
    imaging means for generating an electronic signal which represents the intensity profile of the sheared image in a direction perpendicular to the line image and parallel to the direction of shear;
    means for sampling and digitising the intensity profile of the sheared image;
    means for correlating the digital signal with a digital filter;
    means for automatically adjusting the shearing to a position given by an electronic signal; and
    means for recording two positions of the shearing means, calculating the difference between the two positions, and multiplying said difference by a calibration constant.

2. Apparatus according to claim 1, in which the imaging means comprises a television camera.

3. Apparatus according to claim 1, including display means for displaying a measured width.

4. Apparatus according to claim 3, in which the display means comprises a computer terminal.

5. A method of automatically measuring the width of a line in an optical image in comprising the steps of:
    splitting an optical image into two superimposed images, displacing one image relative to the other, and measuring the displacement distance;
    generating an electronic signal which represents the intensity profile of the sheared image;
    converting the electronic signal into a sampled and digitised signal;
    locating a section of the digitised signal and mathematically correlating it with a digital filter having a peak filter response sensitive to changes in the amount of superimposition of the sheared images;
    detecting the peak filter response from said signal section;
    automatically adjusting the shearing in order to minimise the peak filter response;
    recording the two-edge shear conditions which minimize the peak filter response; and
    computing and providing an output corresponding to the width of the line image.

6. A method according to claim 7, in which the line width being measured comprises the gap of a magnetic recording head.

7. A method according to claim 5, in which the line width being measured comprises the width of a line on a photomask used in the semiconductor industry.

* * * * *